(12) United States Patent
Choi et al.

(10) Patent No.: US 8,347,081 B2
(45) Date of Patent: Jan. 1, 2013

(54) METHOD, APPARATUS AND SYSTEM FOR EMPLOYING A CONTENT PROTECTION SYSTEM

(75) Inventors: Hoon Choi, Mountain View, CA (US); Daekyeung Kim, San Jose, CA (US); Wooseung Yang, Santa Clara, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 729 days.

(21) Appl. No.: 12/316,305

(22) Filed: Dec. 10, 2008

(65) Prior Publication Data

US 2010/0146265 A1  Jun. 10, 2010

(51) Int. Cl.
    *H04L 29/06* (2006.01)
(52) U.S. Cl. ............... 713/158; 713/168; 726/27
(58) Field of Classification Search ................. None
    See application file for complete search history.

(56) References Cited

U.S. PATENT DOCUMENTS

| | | | |
|---|---|---|---|
| 7,124,295 B1 * | 10/2006 | Zhao ........................... 713/158 |
| 2002/0104001 A1 | 8/2002 | Lotspiech et al. |
| 2003/0051152 A1 | 3/2003 | Wuidart et al. |
| 2005/0210241 A1 * | 9/2005 | Lee et al. .................... 713/158 |
| 2006/0253702 A1 | 11/2006 | Lowell et al. |
| 2007/0263869 A1 * | 11/2007 | Oh et al. .................... 380/255 |

FOREIGN PATENT DOCUMENTS

| EP | 1684287 | 7/2006 |
|---|---|---|
| WO | WO-2005003886 | 1/2005 |

OTHER PUBLICATIONS

International Search Report and Written Opinion mailed Jan. 1, 2010 for International Application No. PCT/US2009/059063,.

\* cited by examiner

*Primary Examiner* — Kaveh Abrishamkar
(74) *Attorney, Agent, or Firm* — Blakely, Sokoloff, Taylor & Zafman LLP

(57) ABSTRACT

A method, apparatus and system for employing a secure content protection system is disclosed. In one embodiment, a certificate having a unique device identification associated with a first device is received, and, at a second device, a revocation list having unauthorized device identifications is received. The unique device identification is incrementally compared with the unauthorized device identifications of the revocation list, and media content is transmitted from the second device to the first device, if the unique device identification is not matched with the unauthorized device identifications of the revocation list.

18 Claims, 6 Drawing Sheets

METHOD, APPARATUS AND SYSTEM FOR EMPLOYING A CONTENT PROTECTION SYSTEM

FIELD

Embodiments of the invention generally relate to the field of networks and, more particularly, to employing a secure content protection system.

BACKGROUND

In content protection schemes used for viewing premium AV sources (such as DVD, BlueRay, etc.), revocation list is used to verify whether a device (e.g., TV) is valid and genuinely authorized to have the right to receive and show the protected premium media content (e.g., AV content); however, the use of the revocation list is often not secure and can be a drain on the system resources. For example, a revocation list can be used by a DVD player to detect whether a receiving device, such as a TV, is legal or eligible to receive protected media content from the DVD player. If the unique information associated with the device is not in the revocation list then the device is not regarded an illegal device, thus the protected content is sent; otherwise, the content is not sent. However, an attacker or hacker can fairly easily alter the communication data between checking the revocation list and verifying it to cause consequential interruption and misdirection of data.

One technique would be to make the system closed system, such as putting the revocation list and verification engine in a chip and to process any verification tasks only inside of or on the chip to prevent the hacker from accessing the relevant information. However, one problem with performing the task on the chip is it can add more than 5K bytes to, for example, store the revocation list and that can negatively impact the efficiency of not only signature verification process but also other process within the system. Hence, it is desired to have a system that can perform secure verification of revocation list within a closed and protected system without having to store the entire revocation list on the chip.

FIG. 1 illustrates a conventional content protection scheme 100. In content protection scheme 100, a revocation list is used to detect devices that are known to be illegal or ineligible (e.g., compromised) and stop its operation. For example, transmitting system 102 including a transmission device 104 (e.g., DVD player) and firmware (FW) 106 checks the unique information associated with a receiving device 110 (e.g., TV) of receiving system 108 (having FW 112) to determine whether the receiving device 110 is a valid device and is authorized to receive protected media contents from the transmitting device 104. The determining of whether the receiving device 110 is authorized includes verifying unique information associated with the receiving device 110 that is provided in the revocation list. If the unique information is not verified, the receiving device 110 is refrained from receiving any of the protected media content from the transmitting device 104. Similar processes are performed on the receiving side as the receiving device 110 and firmware 112 verify the transmitting system 102 before communicating with it.

For example, in the illustrated content protection scheme 100, on the transmission side, at the transmitter system 102, the revocation list is fetched by the transmitting FW 106 running, for example, in u-controller to check the signature associated with the transmitting device 104, such as using (Elliptic Curve Digital Signature Algorithm (ECDSA) for Elliptic Curve Cryptography (ECC) 116. On the transmitting firmware side 106, a revocation list is received 114 and then, the signature check is performed 118. The process includes comparing the signature of IdB 124 (associated with the receiving device 110) with the one in the revocation list. If the signature check fails, the transmitting device 104 is stopped 120 from sending any protected content to the receiving device 110. On the other hand, if the signature passes the test, the transmitting FW 106 notifies "pass" to the transmitting device 104 to perform subsequent verification processes. A test to verify the unique identification (unique ID) associated with the receiving device 112 is performed at the transmitting device 104, such as using Elliptic Curve Digital Signature Algorithm-Signature Verification (ECDSAverif) 126. If the unique ID fails the signature verification test, the process is stopped 128 and "fail" is notified. If the unique ID passes the verification and does not match with any one on the revocation list, the process is labeled "pass" and is moved on to the next phase 130.

As illustrated, similar verification processes are also performed on the receiving end of the system by the receiving system 108 to verify the validity and eligibility of the transmitting system 102. The transmitting and receiving systems 102, 108 exchange certificates 138, 140 as a proof of validation of the counterpart system or device.

At least one problem with this content protection scheme 100 is the level of security when the communication is performed between FW 106 and 112 with devices 104 and 110 as indicated by IdB 124 and IdA 142, respectively, such as thru local I2C 132, 148 that is vulnerable to alterations and attacks by hackers. These problem areas are marked by large asterisks 134, 136, 144, 146. Such an attack or alteration can change the IdB 124 and IdA 142 being communicated to FW 106, 112 to pass the comparing phase and/or the final result (e.g., pass/fail) being communicated to devices 104, 110 as shown by asterisks 134, 136, 144, 146.

Such alteration of communication information can paralyze the entire security system and could allow an illegal device to transmit and/or receive protected media content. Thus, it is desirable to have a secure signature checking and unique ID comparison system that is performed on the chip itself providing a closed and more secure system that rids of the necessity to move critical information between FW 106, 112 and devices 104, 110.

It is, therefore, desirable to have a content protection system that is secure and can be protected from hackers without having to add memory space or other burdens to the system.

SUMMARY

A method, apparatus and system for employing a secure content protection system is disclosed.

In one embodiment, a method includes receiving a certificate having a unique device identification associated with a first device, receiving, at a second device, a revocation list having unauthorized device identifications, incrementally comparing the unique device identification with the unauthorized device identifications of the revocation list, and transmitting media content from the second device to the first device, if the unique device identification is not matched with the unauthorized device identifications of the revocation list.

In one embodiment, an apparatus includes a first device coupled with a second device over a network of devices, the first device including a media content receiving device, and the second device including a media content transmitting device, wherein the second device to receive a certificate having a unique device identification associated with the first device, and receive a revocation list having unauthorized device identifications. The apparatus is further to incrementally compare the unique device identification with the unauthorized device identifications of the revocation list, and transmit media content to the first device, if the unique device identification is not matched with the unauthorized device identifications of the revocation list.

In one embodiment, a system to protect media content being communicated between devices over a network of devices is disclosed. The system includes a first device coupled with a second device over the network of devices, the first device including a media content receiving device, and the second device including a media content transmitting device, wherein the second device having a content protection system. The content protection system to facilitate receiving, at the second device, a certificate having a unique device identification associated with the first device, and receiving, at a second device, a revocation list having unauthorized device identifications.

The content protection system is further to facilitate incrementally comparing the unique device identification with the unauthorized device identifications of the revocation list, and transmitting media content from the second device to the first device, if the unique device identification is not matched with the unauthorized device identifications of the revocation list.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
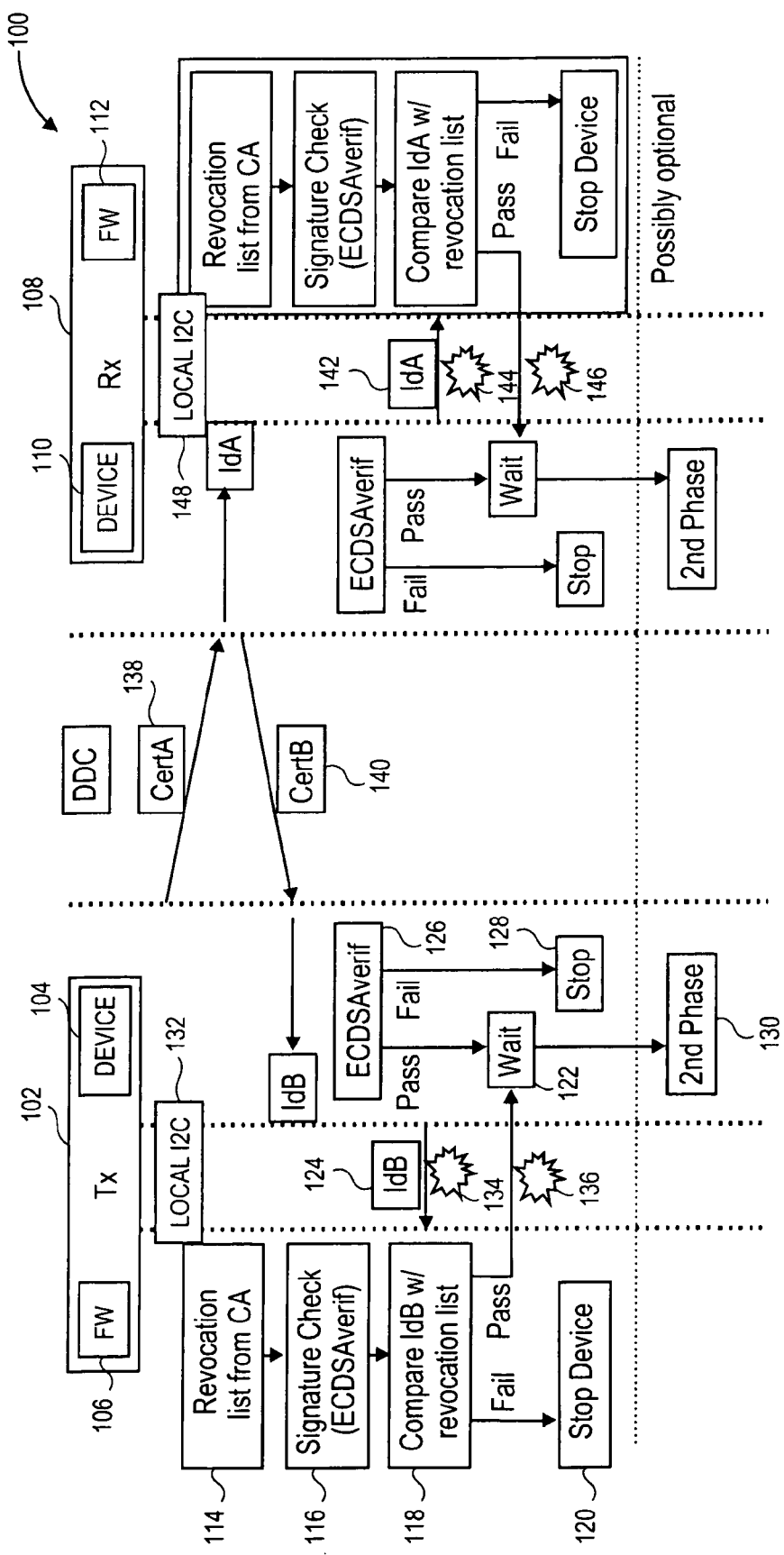
FIG. 1 illustrates a conventional content protection scheme.

Embodiments of the invention are generally directed to a secure revocation list handling in an elliptic-curve-cryptography-based content protection system.

As used herein, "network" or "communication network" mean an interconnection network to deliver digital media content (including music, audio/video, gaming, photos, and others) between devices using any number of technologies, such as SATA, Frame Information Structure (FIS), etc. An entertainment network may include a personal entertainment network, such as a network in a household, a network in a business setting, or any other network of devices and/or components. A network includes a Local Area Network (LAN), Wide Area Network (WAN), Metropolitan Area Network (MAN), intranet, the Internet, etc. In a network, certain network devices may be a source of media content, such as a digital television tuner, cable set-top box, handheld device (e.g., personal device assistant (PDA)), video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions, such as s cable set-top box can serve as a receiver (receiving information from a cable head-end) as well as a transmitter (transmitting information to a TV) and vice versa. In some embodiments, the network devices may be co-located on a single local area network. In other embodiments, the network devices may span multiple network segments, such as through tunneling between local area networks. A network may also include multiple data encoding and encryption processes as well as identify verification processes, such as unique signature verification and unique ID comparison according to one embodiment.

In one embodiment, a content protection system is provided to employ a content protection scheme to provide a dynamic signature verification and unique ID comparison mechanism that is secure and without any additional overhead (e.g., additional memory) to the system.

In content protection schemes, a revocation list is used to detect and verify devices that communicate with each other. These devices include media devices, such a DVD players, CD players, TVs, computers, etc. For example, a revocation list can be used by a DVD player to detect whether a receiving device, such as a TV, is legal or eligible to receive protected media content from the DVD player. If the unique information (including unique signature, unique ID, etc.) associated with the TV does not match with any unique information in the revocation list, the protected content is sent; otherwise, the content is not sent. Similar processes are performed on the receiving system end, e.g., the TV verifies unique information relating to the DVD player before accepting information from it. In one embodiment, a content protection system is provided that is secure and without adding any overhead to the existing resources of the system.

Figure 2:
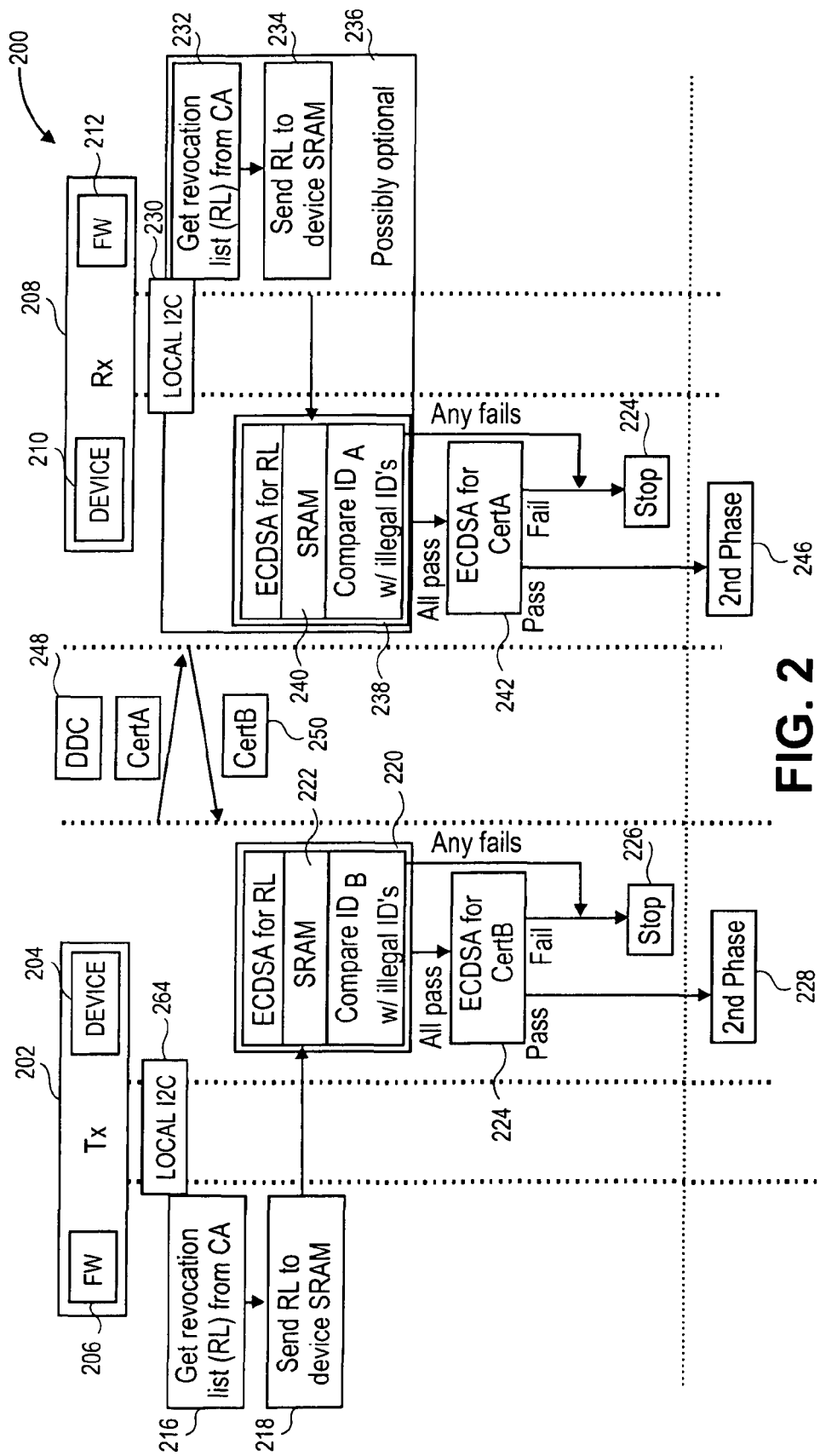
FIG. 2 illustrates a content protection scheme that has the verification process and the revocation list check in the chip to have a more secure system.

FIG. 2 illustrates a content protection scheme 200 that has the verification process and the revocation list check in the chip to have a more secure system. For brevity, previously described features are not repeated. In this case each device 204, 210 has a memory 222, 240 (e.g., SRAM) to receive and store the entire revocation list on the chip. For example, FW 206, 212 receive the revocation list 216, 232 and send the revocation list 218, 234 to the memory 222, 240, such as SRAM, to be stored there on the chip. Then, each device 204, 210 starts the revocation list verification procedure and unique ID check 220, 238. This technique of storing the revocation list on the memory 222, 240 and performing the revocation list check on the chip eliminates the necessity for sending communication data back and forth between devices 204 and 210 and FW 206 and 212, respectively, and thus, removing the trouble areas that can be reached and attached by hackers.

However, one problem in this content protection scheme 200 could be the large memory size. Typically, revocation lists are fairly large in size and even by a conservative estimate a revocation list is more than 5K bytes. This is the minimum size that is added to the memory 222, 240 which could serve as an unnecessary and additional burden on the system and certain processes of the system.

Figure 3:
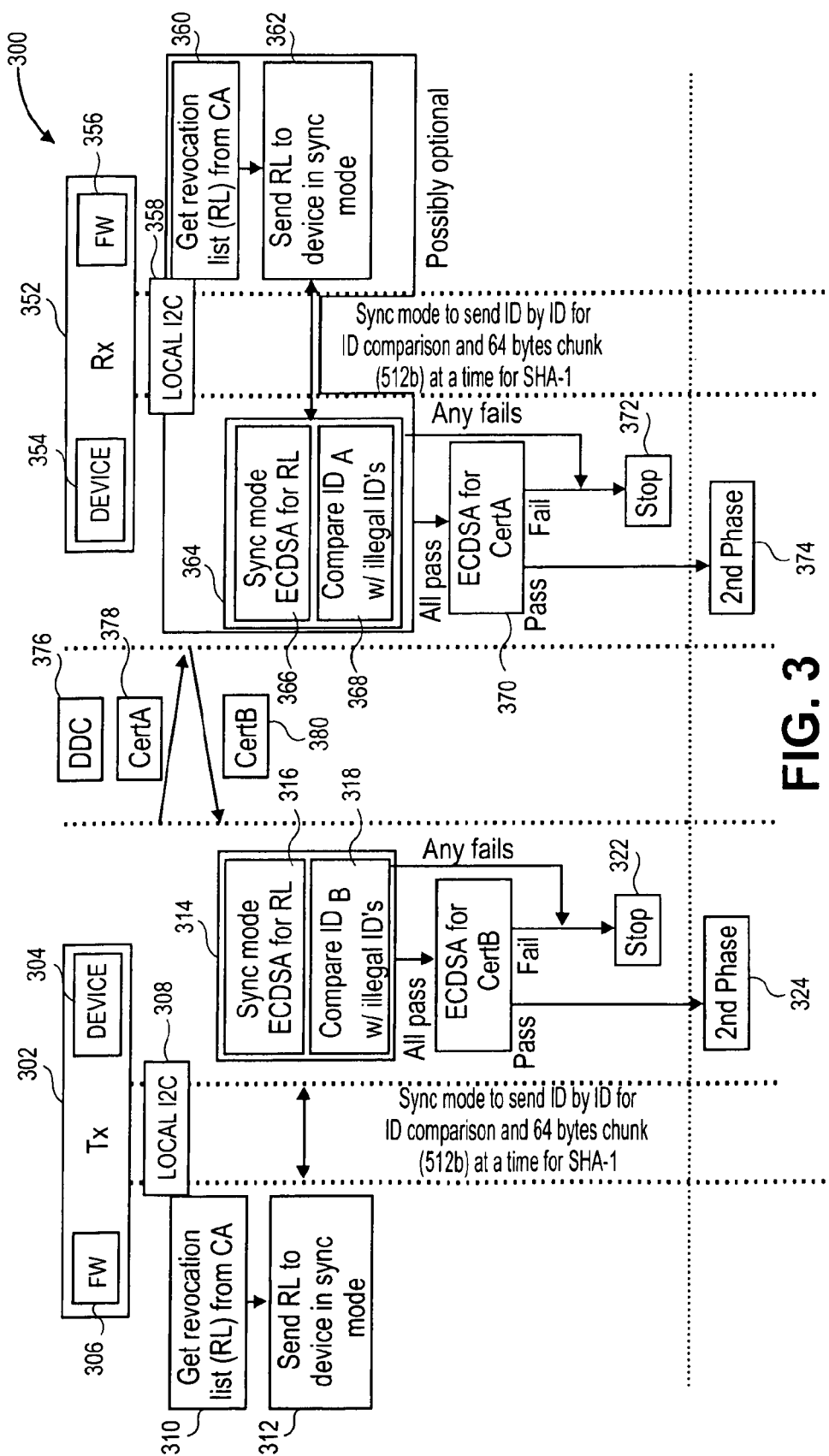
FIG. 3 illustrates an embodiment of a content protection system.

FIG. 3 illustrates an embodiment of a content protection system 300. In the illustrated embodiment, the content protection system 300 includes a transmitting system 302, including a transmitting device 304 (e.g., DVD player, cable set-top box) and transmitting FW 306, in communication with a receiving system 352, including receiving device 354 (e.g., TV) and receiving FW 358. It is contemplated any number of devices may be included in such a network and a device may perform multiple functions, such as device 304 includes a cable box that can function as both a transmitter device when transmitting media content to a receiver device, such as device 354 (e.g., TV) here, and a receiver device when receiving media content from a transmitting data, such as from a cable head-end or transmitter (not shown).

In the illustrated embodiment, the transmitting system 302 verifies the identity of the receiving system 352 and vice versa so that protected media content can be communicated between the two devices 302, 352. The identity verification system is employed and used to not only prevent unauthorized (illegal or ineligible) devices from receiving protected content media but also prevent the authorized devices 304, 354 from receiving unauthorized content from unauthorized devices. For example, a revocation list may be used for identity verification. A revocation list includes device ID (e.g., a unique identification number that is given to each device) that is unique to the device but could be known to be compromised (e.g., its secret key information may be known to public). The revocation list may also include a signature associated with the content authority (CA) that makes, manages, and distributes this revocation list to valid that the revocation list was not modified by others. For example, the unique ID can be implemented as a 64 bit number, and the signature can be made using, for example, an ECDSA signature generation technique using Secure Hash Algorithm (SHA-1) using an ECC-based cryptography. A CA may include an organization (e.g., government, studios, etc) that is responsible for managing the revocation list, checking the device/data communication market for updates, finding out the devices whose secret information is revealed to the public and thus could be compromised, and updating the revocation list to prevent compromised device (or those in danger of being compromised) from further operations/processes of the content protect system 300.

As an example and for clarity, an ECC-based content protection system employing an ECDSA-based signature verification and unique ID comparison system is provided. The use of the ECDSA-based verification/comparison system is for exemplary purposes and it is contemplated that the embodiments are not limited to ECDSA as other verification/comparison systems can also be used. Further, an ECC-based content protection system is illustrated but it is contemplated that techniques described here can be used with other forms of content protection systems. For example, the process using an ECDSA operation includes a revocation list that is composed of message m and signature (r, s). Then, message m goes through hash function (SHA-1 160). The input to this hash function is 512 b (64 bytes) and output is 160 b. Because of this input and output relationship of hash function, the message is split into portions, such as in 512 b chunks, and then the hash function is made to process one chunk at a time. In other words, there is no need to put the entire revocation list in the memory on the chip but rather it is done in portions, such as putting a portion 512 b of the revocation list at a time on the chip. Then, the hash function processes the given 512 b portion, updates the result relating to the given 512 b portion, and subsequently obtains another 512 b and update the result associates with that portion, and so on until all of the data is processed. Further, after message m goes through the hash function (SHA-1 160), all the computation relating to ECDSA becomes irrelevant to message m and depends merely on signature (r, s), and each of them fairly easily is put on the chip since usually they are within a 256 b range.

When the revocation list is received from a CA 310, 360, 1) the signature is checked using the ECDSA signature verification procedure to verify that the revocation list was not modified by anyone who is not authorized to perform such modification, and 2) the unique ID is compared with the list of IDs in the revocation list to determine whether the device 304, 354 is known to be compromised. In one embodiment, using the ECDSA verification/comparison technique, it is not necessary to put the entire revocation list on the memory of the chip. Instead, portions or blocks of 512 b data are sent from time to time from FW 306, 356 to devices 304, 354. One way to accomplish this is to synchronize the operation 316, 366 of FW 306, 356 and devices 304, 354. For example, FW 306, 356 notifies devices 304, 354 when a block of 512 b data is ready to be sent, the amount of time that would be involved in completing the process of sending this block and getting the next block of 512 b data ready, etc. This communication can be performed using a register for reading and writing, such a local 12C register 308, 358.

Further, for unique ID comparison, when FW 306, 356 sends a 512 b block of data to a corresponding device 304, 354, it further splits the block of data into a number of sub-blocks (e.g., a group of 8 sub-blocks) and notifies the device 304, 354 at the start of the sending of each of the sub-blocks of the group, such as at the beginning of each of the 8 sub-blocks of the group, and similarly, notify at the end of the sending of each of the sub-blocks of the group. This technique helps the device 304, 354 to get to know the unique ID more and more as it receives each of the 8 groups and starts incremental comparing the (partial) unique ID with the one on the revocation list 318, 368.

For example, a unique ID in a block of 512 b associated with the receiving device 354 is partitioned in sub-blocks, such as 8 sub-blocks. The transmitting device 304, which is synchronized 316 with the transmitting FW 306, begins to receive the unique ID stream from the transmitting FW 306 in increments (e.g., 8 increments corresponding to 8 sub-blocks). As soon as the transmitting device 304 receives the first increment of the unique ID, it starts to compare the unique ID with the one on the revocation list 318 to verify whether the unique ID is legal/authorized. The process may continues until the last of the increments (e.g., $8^{th}$ increment) of the unique ID stream is received and at that point, the comparison of all increments of the unique ID streams with the one of the revocation list is finished and decision is made as to whether the unique ID was legal. In other words, in one embodiment, not only the data stream is received in increments, but also the comparison is performed in increments. If it fails, the process is stopped 322, 372 and no exchange of protected content media takes place between the two devices 304, 354, but if it passes, the process moves on to the next phase 324, 374. In addition, ECDSA 320 and 370 may be used for the verification of certifications 380 and 378.

In the illustrated embodiment, both the unique ID comparison and the signature verification, such as using ECDSA, are done incrementally, such as in blocks of 512 b (64 bytes for SHA-1) at a time and ID by ID further portioned into smaller blocks. Thus, it is not necessary to put the entire revocation list in the memory on the chip. In one embodiment, simply blocks/sub-blocks of bits (e.g., 512 b) are prepared and sent once at a time and the underlying devices 304, 354 are synchronized with the corresponding FW 306, 356 using a synchronization scheme. Further, it is not necessary to store input portions of bits once the computation has been completed. These techniques eliminate the necessity to have a large memory which saves resources, eliminates overhead, and enhances efficiency of the communicating systems 302, 352, the content protection system 300, and the network(s) involved. Additionally, the verification and comparison operations/processes and other relevant operations/processes are performed on the chip, making the content protection system 300 a closed and secure system.

A certificate 378, 380 includes a public key associated with a device that is needed for other devices to make an encrypted message for the device. For example, certificated B 380 is associated with device 354 and received by device 304 and is then used by device 304 to encrypt content media for device 354. The content media or message can be decrypted only by the device that has the private key corresponding to the public key, such as device 354. The certificated 378, 380 may also include a unique device ID (e.g., the unique number associated with the corresponding device) and other information necessary for each protocol. Any data in the certification 378, 380 is protected by a signature, so that the user of the certificate 378, 380 can verify whether the certification 378, 380 was changed by someone who was not authorized to make the change.

Further, SHA-1 refers to a hash function that converts m bit data into n bit data where m is much larger than n. It is considered a one way function and thus, the m bit is not be recovered from the n bit output of the hash function. SHA-1 is used in the cryptography algorithm, particularly for signature generation and verification. In one embodiment, SHA-1 is incrementally computed, e.g., 512 bits or 64 bytes at a time. Further, the certification authentication phase 320, 370 includes processes to determine whether the other device from where the certificate was received is aware of the private key corresponding to the public key of the certificate 378, 380. The authentication phase 320, 370 is initiated after it is verified that the underlying device 304, 354 is or is not in the revocation list.

Figure 4:
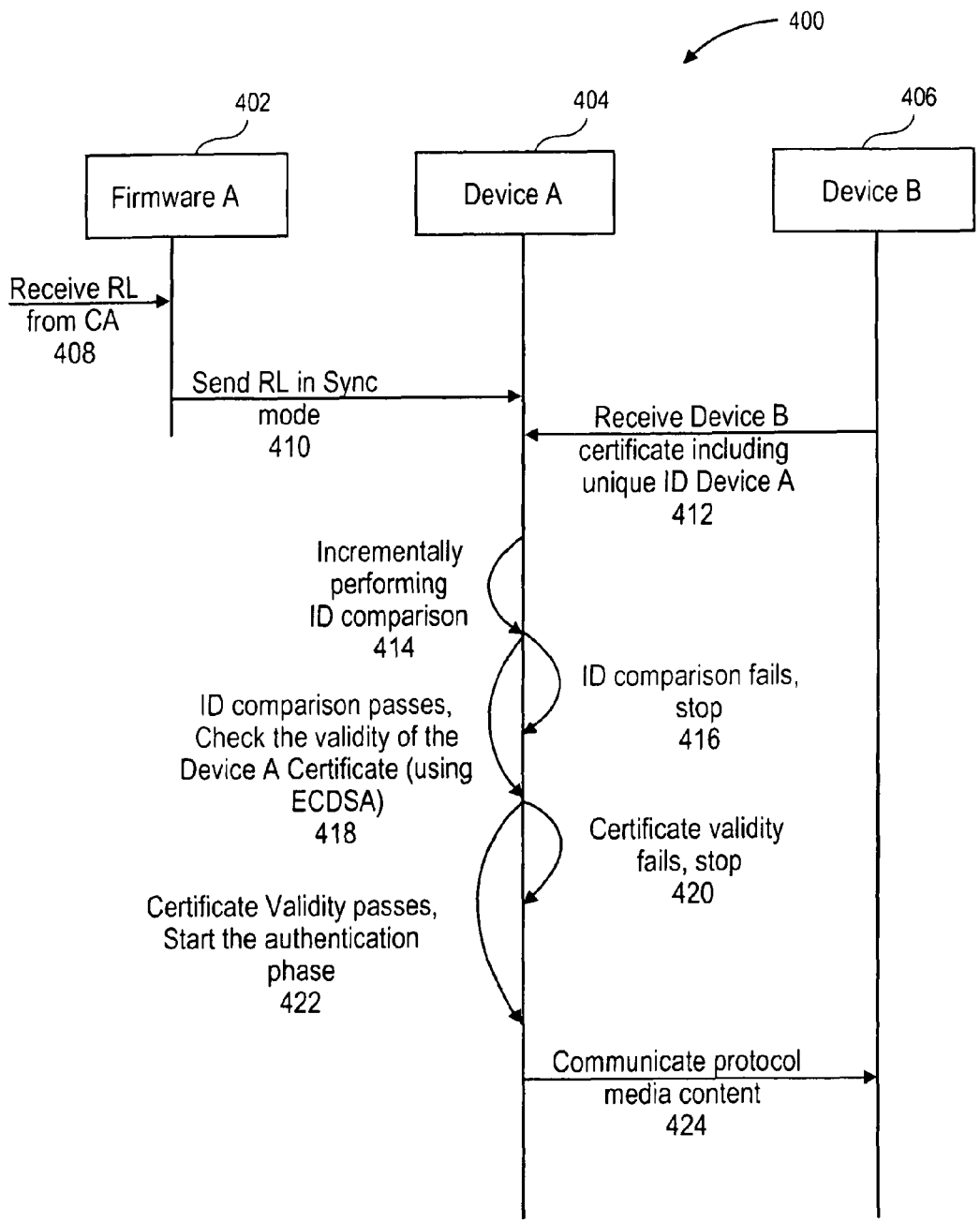
FIG. 4 illustrates an embodiment of a transaction sequence of a content protection system.

FIG. 4 illustrates an embodiment of a transaction sequence of a content protection system 400. In the illustrated embodiment, the content protection system 400 includes device A 404, device B 406, and firmware A 402 associated with device A 404. In one embodiment, FW A 402 receives a revocation list from a content authority 408. This revocation list is then sent, incrementally, from firmware A 402 to device A 404 in a synchronized mode. This technique of transmitting the revocation list in increments includes sending the revocation list in small portions or increments (e.g., in increments of 64 bytes or 512 bits) at a time to facilitate incremental operation of SHA-1 and ID comparison. Device A 404, through DDC, receives a certificate 412 associated with device B 406. The certificate includes a unique ID associated with device B 406, which is extracted from the certificate by device A 404.

At device A 404, for each increment of the revocation list received from FW A 402, SHA-1 is incrementally run to perform ECDSA of the revocation list, and the unique ID associated with device B 406 is compared with IDs (e.g., illegal IDs) contained in the incrementally received portions of the revocation list 414. If the ECDSA-based ID comparison of the unique ID fails (e.g., the unique ID of device B 406 matches with one of the illegal IDs contained in the revocation list), the process stops 416 and any media content communication between devices A and B 404, 406 is blocked (e.g., device B 406 is not authorized to receive protected media content from device A 404).

If the ID comparison passes (e.g., unique ID associated with device B 406 does not match with illegal IDs of the revocation list, meaning the unique ID is valid), the validity of the certificate associated with device B 406 is checked through ECDSA 418 at device A 404. If the certificate validity fails, the process stops 420 and any protected media content between device A 404 and device B 406 is not initiated. If, however, the certificate validity passes, the process proceeds to the authentication phase 422. Once the authentication phase is completed, communication between device A 404 and device B 406 is established and, for example, protected media content is transmitted 424 from device A 404 to device B 406. The certification authentication phase includes determining whether device B 406 (from where the certificate was received) is aware of the private key corresponding to the public key of the certificate being authenticated.

Figure 5:
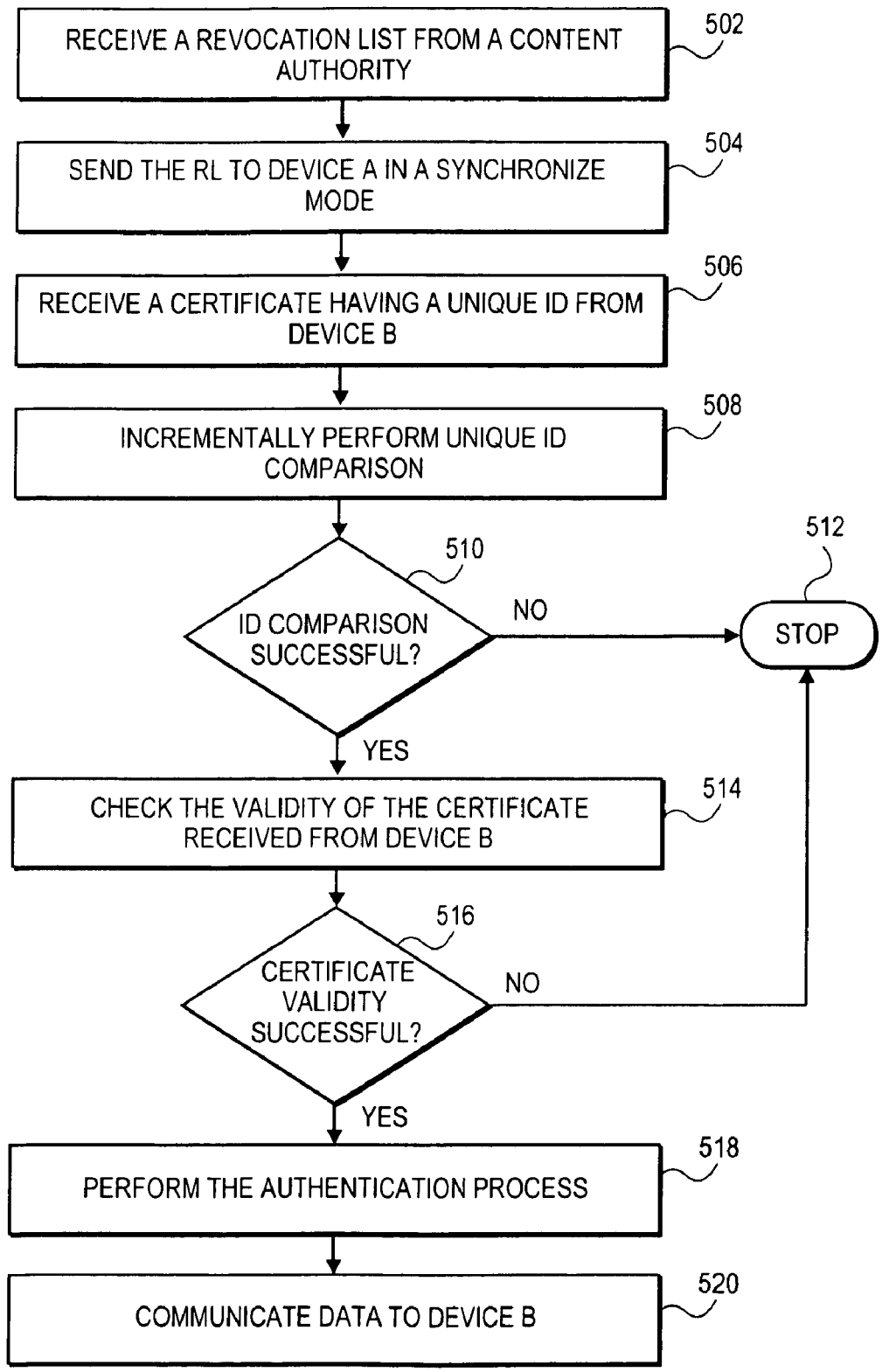
FIG. 5 illustrates an embodiment of a process of a content protection system.

FIG. 5 illustrates an embodiment of a process of a content protection system. In one embodiment, at processing block 502, FW A associated with device A receives a revocation list from a content authority 408. A synchronized mode is established between FW A and device A and, at processing block 504, the revocation list is then sent, incrementally, from FW A to device A in the synchronized mode. In one embodiment, this process of incremental transmission of the revocation list includes sending the revocation list in small portions or increments (e.g., in increments of 64 bytes or 512 bits) at a time to facilitate incremental operation of SHA-1 and ID comparison. At processing block 506, device A, through DDC, receives a device certificate associated with device B from device B. This device certificate includes a unique ID associated with and identifying device B. This ID is then extracted from the certificate by device A for later comparison and verification.

At processing block 508, in one embodiment, an incremental comparison of the unique ID associated with device B is performed. For example, at device A, for each increment of the revocation list received from FW A, SHA-1 is incrementally run to perform ECDSA of the revocation list, and the unique ID associated with device B is compared with IDs (e.g., illegal IDs) contained in the incrementally received portions of the revocation list. For example, as soon as the first increment (e.g., a 512 b increment) of the revocation list is received, the unique ID is compared with the IDs contained in that first increment of the revocation list. At decision block 510, a determination is made as to whether the ID comparison (e.g., ECDSA-based ID comparison) of the unique ID has been successful. If the ID comparison fails (e.g., the unique ID of device B matches with one of the illegal IDs contained in the revocation list), the process stops at block 512. This means any media content communication between devices A and B is blocked (e.g., device B is not authorized to receive protected media content from device A).

If, however, the unique ID comparison passes (e.g., unique ID associated with device B is not matched with any of the illegal IDs of the revocation list, meaning the unique ID is valid), the validity of the device certificate associated with device B is checked (e.g., through ECDSA) at device A at processing block 514. At decision block 516, a determination is made as to whether the certificate validity was successful. If the certificate validity fails, the process stops at block 512 and any protected media content between device A and device B is not initiated. If, however, the certificate validity passes, the process proceeds to the authentication phase (e.g., authentication of the device certificate is performed) at processing block 518. Once the authentication phase is completed, communication between device A and device B is established and, for example, protected media content is transmitted from device A to device B at processing block 520. The certification authentication phase includes determining whether device B (from where the certificate was received) is aware of the private key corresponding to the public key of the certificate being authenticated.

Figure 6:
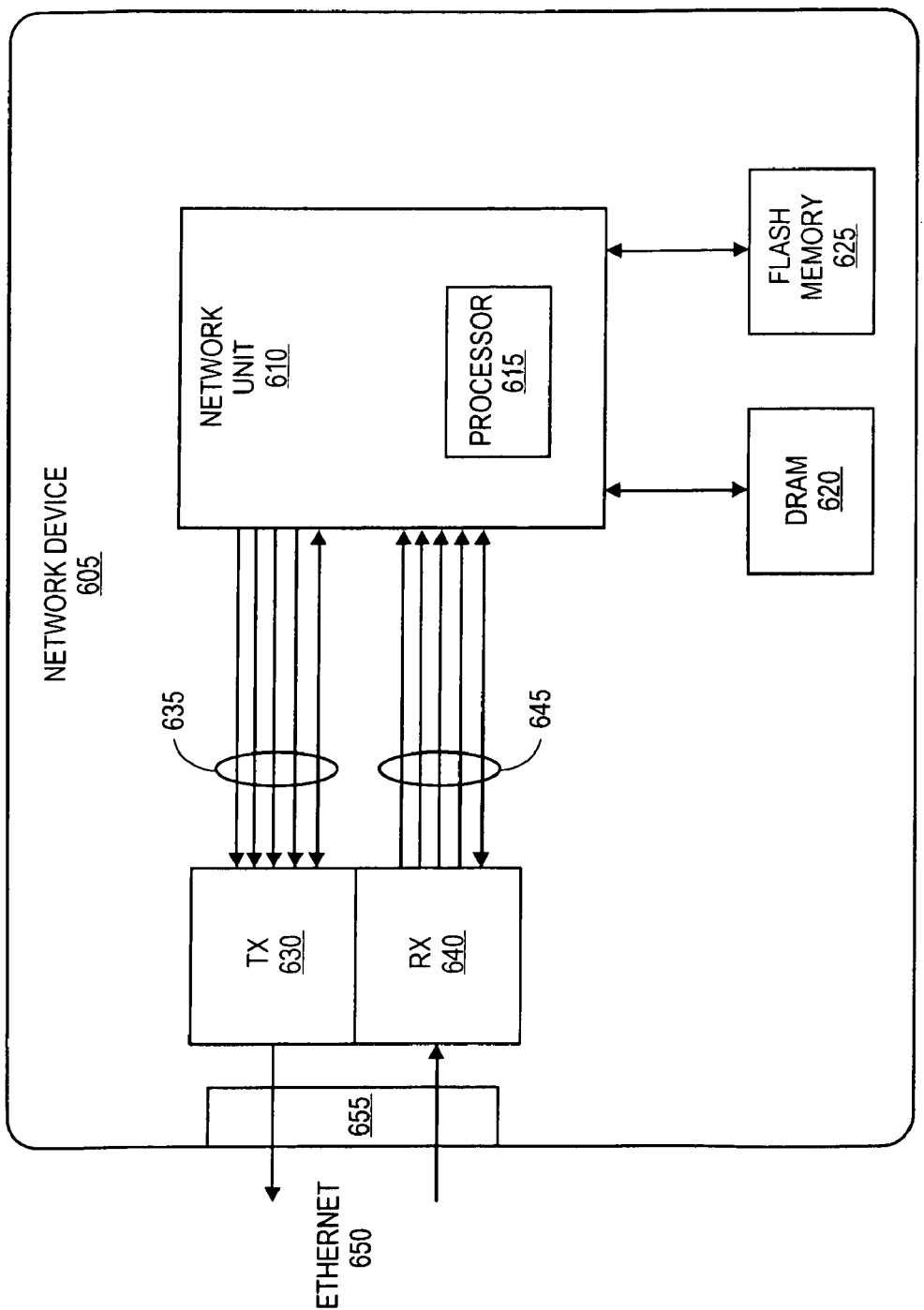
FIG. 6 is an illustration of embodiments of components of a network computer device.

FIG. 6 is an illustration of embodiments of components of a network computer device 605. In this illustration, a network device 605 may be any device in a network, including, but not limited to, a television, a cable set-top box, a radio, a DVD player, a CD player, a smart phone, a storage unit, a game console, or other media device. In some embodiments, the network device 605 includes a network unit 610 to provide network functions. The network functions include, but are not limited to, the generation, transfer, storage, and reception of media content streams. The network unit 610 may be implemented as a single system on a chip (SoC) or as multiple components.

In some embodiments, the network unit 610 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 620 or other similar memory and flash memory 625 or other nonvolatile memory.

The network device 605 may also include a transmitter 630 and/or a receiver 640 for transmission of data on the network or the reception of data from the network, respectively, via one or more network interfaces 655. The transmitter 630 or receiver 640 may be connected to a wired transmission cable, including, for example, an Ethernet cable 650, a coaxial cable, or to a wireless unit. The transmitter 630 or receiver 640 may be coupled with one or more lines, such as lines 635 for data transmission and lines 645 for data reception, to the network unit 610 for data transfer and control signals. Additional connections may also be present. The network device 605 also may include numerous components for media operation of the device, which are not illustrated here.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a port multiplier enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically EPROM (EEPROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an"element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
 receiving a certificate having a unique device identification associated with a first device;
 incrementally receiving, at a second device, a revocation list having unauthorized device identifications, wherein the revocation list is received incrementally in small portions such that the revocation list is not required to be stored at a memory of the second device;

incrementally comparing the unique device identification with the unauthorized device identifications listed in the incrementally-received revocation list, wherein incremental comparing is performed at a processor of the second device and without having to store the revocation list at the memory of the second device, wherein incremental comparing includes running a hash function to process each small portion of the revocation list, update results associated with each processed small portion, and process a subsequent portion of the revocation list, and wherein each small portion lists one or more unauthorized device identifications; and transmitting media content from the second device to the first device, if the unique device identification is not matched with the unauthorized device identifications of the revocation list.

2. The method of claim 1, wherein the receiving of the revocation list comprises incrementally receiving, at the second device, the revocation list from firmware.

3. The method of claim 2, further comprising receiving the revocation list, at the firmware, from a content authority.

4. The method of claim 1, further comprising verifying the certificate, if the unique device identification is not matched with the unauthorized device identifications of the revocation list.

5. The method of claim 4, further comprising performing certificate authentication process if the certificate is successfully verified.

6. The method of claim 1, further comprising preventing the first device from receiving the media content from the second device if the unique device identification is matched with an unauthorized device identification of the revocation list, the verification of the certificate fails, or the authentication of the certificate fails.

7. An apparatus comprising:
a first device coupled with a second device over a network of devices, the first device including a media content receiving device, and the second device including a media content transmitting device, wherein the second device to
receive a certificate having a unique device identification associated with the first device;
incrementally receive a revocation list having unauthorized device identifications, wherein the revocation list is received incrementally in small portions such that the revocation list is not required to be stored at a memory of the second device;
incrementally compare the unique device identification with the unauthorized device identifications listed in the incrementally-received revocation list, wherein incremental comparing is performed at a processor of the second device and without having to store the revocation list at the memory of the second device, wherein incremental comparing includes running a hash function to process each small portion of the revocation list, update results associated with each processed small portion, and process a subsequent portion of the revocation list, and wherein each small portion lists one or more unauthorized device identifications; and
transmit media content to the first device, if the unique device identification is not matched with the unauthorized device identifications of the revocation list.

8. The apparatus of claim 7, wherein the second device to incrementally receive the revocation list from firmware.

9. The apparatus of claim 8, wherein the firmware to receive the revocation list from a content authority.

10. The apparatus of claim 7, wherein the second device to verify the certificate, if the unique device identification is not matched with the unauthorized device identifications of the revocation list.

11. The apparatus of claim 10, wherein the second device to perform certificate authentication process if the certificate is successfully verified.

12. The apparatus of claim 7, wherein the second device to prevent the first device from receiving the media content if the unique device identification is matched with an unauthorized device identification of the revocation list, the verification of the certificate fails, or the authentication of the certificate fails.

13. A system to protect media content being communicated between devices over a network of devices, the system comprising:
a first device coupled with a second device over the network of devices, the first device including a media content receiving device, and the second device including a media content transmitting device, wherein the second device having a content protection system, the content protection system to facilitate
receiving, at the second device, a certificate having a unique device identification associated with the first device;
incrementally receiving, at a second device, a revocation list having unauthorized device identifications, wherein the revocation list is received incrementally in small portions such that the revocation list is not required to be stored at a memory of the second device;
incrementally comparing the unique device identification with the unauthorized device identifications listed in the incrementally-received revocation list, wherein incremental comparing is performed at a processor of the second device and without having to store the revocation list at the memory of the second device, wherein incremental comparing includes running a hash function to process each small portion of the revocation list, update results associated with each processed small portion, and process a subsequent portion of the revocation list, and wherein each small portion lists one or more unauthorized device identifications; and
transmitting media content from the second device to the first device, if the unique device identification is not matched with the unauthorized device identifications of the revocation list.

14. The system of claim 13, wherein the content protection system is further to facilitate incrementally receiving the revocation list, at the second device, from firmware.

15. The system of claim 14, wherein the content protection system is further to facilitate receiving the revocation list, at the firmware, from a content authority.

16. The system of claim 13, wherein the content protection system is further to facilitate verifying the certificate, if the unique device identification is not matched with the unauthorized device identifications of the revocation list.

17. The system of claim 16, wherein the content protection system is further to facilitate performing certificate authentication process if the certificate is successfully verified.

18. The system of claim 13, wherein the content protection system is further to facilitate preventing the first device from receiving the media content from the second device if the unique device identification is matched with an unauthorized device identification of the revocation list, the verification of the certificate fails, or the authentication of the certificate fails.

* * * * *